April 28, 1964 T. STEEL ETAL 3,131,007
BEARING ASSEMBLY
Filed April 30, 1962
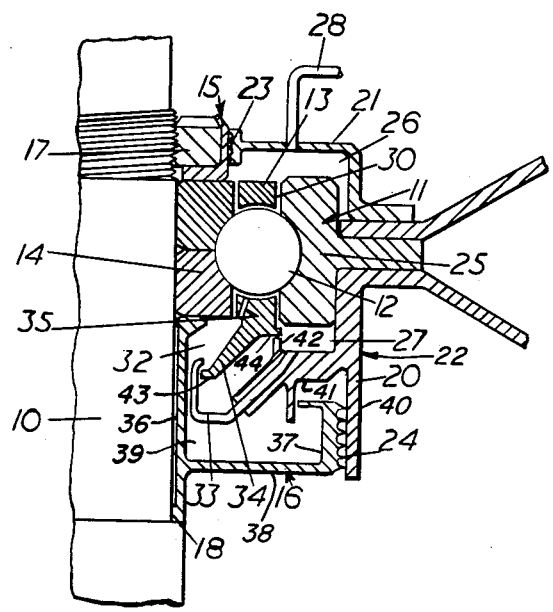
Inventors
Thomas Steel
Norman Robert Robinson
John Michael Storer Keen
By
Cushman, Darby & Cushman
Attorneys

United States Patent Office 3,131,007
Patented Apr. 28, 1964

3,131,007
BEARING ASSEMBLY
Thomas Steel, Littleover, Derby, Norman Robert Robinson, Derby, and John Michael Storer Keen, Allestree, Derby, England, assignors to Rolls-Royce Limited, Derby, England, a company of Great Britain
Filed Apr. 30, 1962, Ser. No. 190,984
Claims priority, application Great Britain May 3, 1961
5 Claims. (Cl. 308—187)

This invention concerns a bearing assembly.

According to the present invention, there is provided a bearing assembly comprising a bearing for a substantially vertically mouned shaft, a lower chamber which is disposed below the bearing and to which may drain lubricant from the bearing, and means including a syphon tube for returning the lubricant from the lower chamber to the bearing, whereby the lubricant may be re-circulated through the bearing assembly.

Preferably the syphon tube is adapted to convey the lubricant from the said lower chamber to a rotatable part of the bearing assembly, rotation of said rotatable part causing the lubricant to be returned to the bearing.

Thus the syphon tube may be adapted to convey the lubricant from the said lower chamber to a further chamber which is disposed beneath the bearing, the said further chamber having an outer wall which is outwardly inclined towards the bearing, the said outer wall constituting the said rotatable part, whereby the lubricant is caused to travel up the outwardly inclined wall to the bearing.

Preferably the bearing is a ball bearing provided with a cage, the cage having a frusto-conical wall which constitutes the said outer wall of the said further chamber.

The bearing and the said lower and further chambers may be disposed within a housing a part of which is adapted to be secured to fixed structure, the remaining part of the housing being adapted to be secured to the shaft and the two parts of the housing being sealed to each other.

Preferably there is mounted within the housing an upper chamber which is disposed above the bearing, the upper chamber communicating with the bearing and being adapted to be supplied with a quantity of lubricant.

The bearing assembly preferably constitutes a thrust bearing.

The invention also comprises a substantially vertically disposed shaft which is journalled within a bearing assembly as set forth above.

Additionally, the invention comprises a gas turbine engine which is mounted so that the turbine exhaust gases are downwardly directed, the engine having a substantially vertically disposed shaft which carries the compressor means and the turbine means of the engine and which is journalled within a bearing assembly as set forth above.

The invention is illustrated, merely by way of example in the accompanying drawing which shows a broken-away sectional view of part of a gas turbine engine, the said engine having a shaft which is journalled within a bearing assembly according to the present invention.

Referring to the drawing, an aircraft (not shown) which is adapted for vertical take-off and landing is provided with a number of vertically mounted gas turbine engines (not shown) whose turbine exhaust gases are downwardly directed. Each of the said engines has a main engine shaft 10 which is substantially vertically disposed (e.g. at an angle of 10° to the vertical). The shaft 10 carries the compressor or compressors (not shown) and the turbine or turbines (not shown) of the respective engine.

The shaft 10 is journalled within a bearing assembly including bearing means generally designated by the numeral 11 which constitutes a thrust bearing. The bearing means 11 includes rolling elements such as ball bearings 12 and a cage 13 in which the roller elements or ball bearings are angularly spaced and supported. A two part inner race 14 for the bearing means 11 is disposed between upper and lower annular housing members 15 and 16 respectively.

The annular housing member 15 is located against a ring 17 which is threaded onto the shaft 10, while the annular housing member 16 is located against a shoulder 18 on the shaft 10. The lower or bottom housing member 16 includes an inner sleeve portion 36, an outer sleeve portion 37 radially spaced from the inner sleeve portion 36, and a disc portion 38 interconnecting the sleeve portions 36 and 37 which project upwardly therefrom. The lower housing member 16 thus defines a lubricant collecting chamber 39. The ring 17 when threaded onto the shaft 10 and against the housing member 15 causes the inner race 14 together with the ball bearings 12 and cage 13 to be effectively fixed to the shaft 10 and, thus, rotate with the same. A fixed casing means generally designated by the numeral 22 includes a lower housing member 20 and an upper housing member 21. The lower housing member 20 of the casing means 22 comprises an outer wall 40, a first flange 41 projecting radially inwardly from the outer wall and a second flange 42 carried by the first flange and extending upwardly therefrom in spaced relationship to the outer wall. The outer wall 40 and the first and second flanges 41 and 42 define a lubricant sump or chamber 27 whereas the upwardly facing surface of the first flange 41 forms the bottom of the sump. The housing members 20, 21 are connected (by means not shown), to a fixed structure, labyrinth seals 23, 24 being respectively provided between the housing members 15, 21 and the housing members 16, 20.

The bearing assembly has an outer race 25 which is carried by the fixed housing members 20, 21 of casing means 22.

Mounted within the upper housing member 21 of casing means 22 is an upper chamber 26. As will now be apparent from reference to the drawing, the upper chamber 26 and the lower chamber 27 are respectively mounted above and below the ball bearings 12. A predetermined quantity of lubricant, in the form of a single shot thereof, may be supplied to the upper chamber 26 by way of a pipe 28. Lubricant from the upper chamber 26 may reach the ball bearings 12 through a space 30 between the outer race 25 and the cage 13. This lubricant may then drain through the space 30 to the lower chamber or sump 27.

Immediately beneath the inner race 14 there is formed a chamber 32 which is connected to the chamber 27 by duct means such as a syphon tube 33. One wall of the chamber 32 is constituted by a frusto-conical wall or annular skirt 34 depending downwardly from the cage 13 to a rim 43 positioned beneath the bottom of the sump 27 as defined by the upper surface of the first flange 41. The frusto-conical wall or skirt 34 is outwardly inclined towards the ball bearings 12. The cage 13 is also provided with drillings 35 which communicate with the frusto-conical wall 34 and with an oil-slinging flange 44 projecting radially outwardly from the upper end of the wall or skirt 34 of the upwardly projecting flange 42.

In operation, lubricant supplied to the upper chamber 26 drains past the ball bearings 12 onto the oil-slinging flange 44 into the lower chamber 27 and is then syphoned into the chamber 32 since the outlet of the duct means adjacent the skirt 34 is on a lower level than the inlet of the duct means from the chamber or sump 27, there will always be a syphoning effect from the chamber or sump 27 due to the skirt 34 as long as there is lubricant in the sump 27. The rotation of the ball bearings 12 causes rotation of the cage 13 and hence of the frusto-conical wall or skirt 34. The lubricant is therefore forced up the frusto-conical wall 34 and through the drillings 35 so as to be supplied again to the ball bearings 12. It will be noted from the reference to the drawings that the skirt 34 depends from the cage 13 in such a manner that no portion thereof depends or extends into the chamber or sump 27. Since the skirt 34 rotates and since it does not extend into the sump it will not generate heat in the lubricant in the sump thus eliminating thermal expansion problems and sealing problems.

The bearing assembly shown in the drawing is thus particularly suitable for use in locations where it will only be supplied with a single shot of lubricant.

We claim:

1. In a bearing assembly having a substantially vertical shaft, the bearing assembly having bearing means therein surrounding the shaft, the improvement comprising: a lubricant sump disposed below the bearing means for receiving lubricant therefrom, said sump having an upwardly facing bottom surface; a freely downwardly depending rotating annular skirt arranged coaxially of the shaft and radially inwardly of the sump between the same and the shaft with no part thereof depending into the sump, said skirt having a bottom rim at the lower end thereof and an inner surface diverging upwardly from the bottom rim towards said bearing means, said upwardly facing bottom surface of said sump being positioned above the level of said bottom rim of the skirt; and duct means having an inlet opening in the upwardly facing bottom surface of said sump and an outlet opening located at a lower level than said inlet opening and vertically overhanging the inner surface of said skirt whereby the lubricant received in said sump from said bearing means flows though said duct means and onto the inner surface of said skirt and upwardly therealong for recirculation to the bearing means.

2. In a bearing assembly having a substantially vertical shaft, the improvement comprising: casing means surrounding the shaft, said casing means including an outer wall, a first flange projecting radially inwardly from said outer wall and a second flange carried by said first flange and extending upwardly therefrom and spaced inwardly from said outer wall, said outer wall and said first and second flanges defining a lubricating sump, said first flange having an upwardly facing surface defining a bottom for said sump; bearing means disposed above said lubricant sump for rotatably mounting the shaft to said casing means, said bearing means including a plurality of rolling elements and a rotating cage supporting said rolling elements in angularly spaced apart relationship from one another around the shaft; an annular skirt depending downwardly from said cage and radially inwardly of said second flange of the casing means with no part thereof depending into the lubricant sump, said skirt having a bottom rim at the lower end thereof and an inner surface diverging upwardly from the bottom rim towards the rolling elements, the upper surface of said first flange being positioned above the level of the bottom rim of said skirt; and duct means having an inlet opening in the upwardly facing surface of said first flange and an outlet opening located at a lower level than said inlet opening and vertically overhanging said inner surface of the skirt whereby the lubricant received in the sump from said bearing means flows through said duct means and onto the inner surface of said skirt and upwardly therealong for recirculation to the bearing means.

3. A bearing assembly as claimed in claim 2 including an oil-slinging flange projecting radially outwardly from said cage adjacent the upper end of the downwardly depending skirt, said oil-slinging flange extending over said second flange whereby any lubricant received thereon is slung into said lubricant sump.

4. A bearing assembly as claimed in claim 2 including a bottom annular housing member fixedly connected to the shaft, said housing member including an inner sleeve portion, an outer sleeve portion radially spaced from said inner sleeve portion and disk portion interconnecting said sleeve portions both sleeve portions projecting upwardly from said disk portion and defining with said disk portion a lubricant collecting chamber, said outer sleeve portion of said housing member terminating above said disk portion at a level below that of the bottom rim of said skirt and sealing means between said outer sleeve portion of the housing member and said casing means.

5. A bearing assembly as defined in claim 4 wherein said sealing means includes a labyrinth seal between said outer sleeve portion and said casing means.

References Cited in the file of this patent

UNITED STATES PATENTS

| | | |
|---|---|---|
| 1,499,949 | Sawyer | July 1, 1924 |
| 1,920,326 | Schuck et al. | Aug. 1, 1933 |
| 2,266,107 | Waterfill | Dec. 16, 1941 |
| 2,427,748 | Schuck | Sept. 23, 1947 |
| 2,635,198 | Wieseman | Apr. 14, 1953 |
| 2,926,052 | Cain | Feb. 23, 1960 |